(12) United States Patent
Gonzalez Gozalbo et al.

(10) Patent No.: US 9,481,443 B2
(45) Date of Patent: Nov. 1, 2016

(54) REAR FUSELAGE SECTION OF AN AIRCRAFT

(71) Applicant: Airbus Operations S.L., Madrid (ES)

(72) Inventors: Alfonso Gonzalez Gozalbo, Madrid (ES); Raul Carlos Llamas Sandin, Madrid (ES)

(73) Assignee: Airbus Operations S.L., Getafe (ES)

( * ) Notice: Subject to any disclaimer, the term of this patent is extended or adjusted under 35 U.S.C. 154(b) by 164 days.

(21) Appl. No.: 14/445,537

(22) Filed: Jul. 29, 2014

(65) Prior Publication Data

US 2015/0034765 A1 Feb. 5, 2015

(30) Foreign Application Priority Data

Jul. 30, 2013 (EP) .................... 13178465

(51) Int. Cl.
| | | |
|---|---|---|
| *B64C 1/06* | (2006.01) | |
| *B64C 1/10* | (2006.01) | |
| *B64C 1/26* | (2006.01) | |
| *B64C 7/00* | (2006.01) | |
| *B64C 9/00* | (2006.01) | |
| *B64C 25/00* | (2006.01) | |
| *B64C 5/02* | (2006.01) | |
| *B64C 5/16* | (2006.01) | |

(52) U.S. Cl.
CPC ............... *B64C 1/068* (2013.01); *B64C 1/10* (2013.01); *B64C 1/26* (2013.01); *B64C 5/02* (2013.01); *B64C 5/16* (2013.01); *B64C 7/00* (2013.01); *B64C 9/00* (2013.01); *B64C 25/00* (2013.01); *B64C 2025/005* (2013.01)

(58) Field of Classification Search
CPC .......... B64C 1/068; B64C 5/16; B64C 7/00; B64C 25/00; B64C 9/00; B64C 5/02; B64C 1/26; B64C 1/10; B64C 2025/005
See application file for complete search history.

(56) References Cited

U.S. PATENT DOCUMENTS

| | | | |
|---|---|---|---|
| 5,096,142 A | 3/1992 | Rodriguez | |
| 2009/0152400 A1* | 6/2009 | Verde Preckler | B64C 1/40 244/133 |
| 2010/0108803 A1* | 5/2010 | Arevalo Rodriguez | B64C 5/02 244/99.2 |
| 2010/0148000 A1* | 6/2010 | Llamas Sandin | B64C 5/02 244/87 |
| 2011/0111605 A1* | 5/2011 | Mart Nez Valdegrama | B64D 45/02 439/32 |
| 2012/0138738 A1* | 6/2012 | Vela Orge | B64C 5/02 244/87 |
| 2012/0298795 A1* | 11/2012 | Cazals | B64C 5/02 244/87 |
| 2013/0001356 A1* | 1/2013 | Llamas Sand N | B64C 1/26 244/54 |

FOREIGN PATENT DOCUMENTS

| | | |
|---|---|---|
| DE | 102005003297 | 7/2006 |
| ES | 2373812 | 2/2012 |
| FR | 2975666 | 11/2012 |

OTHER PUBLICATIONS

European Search Report, Jan. 7, 2014.

* cited by examiner

*Primary Examiner* — Valentina Xavier
(74) *Attorney, Agent, or Firm* — Greer, Burns & Crain

(57) ABSTRACT

A rear fuselage section of an aircraft comprises at least one closed frame constructed as a unitary body, and a horizontal tail plane comprising a box-type central element and two lateral torsion boxes, said horizontal tail plane trimmable with respect to a pivot axis. The horizontal tail plane is mounted at the closed frame and the pivot axis is contained in a horizontal plane below the lowest end of said closed frame.

12 Claims, 11 Drawing Sheets

REAR FUSELAGE SECTION OF AN AIRCRAFT

CROSS-REFERENCES TO RELATED APPLICATIONS

This application claims the benefit of the European patent application No. 13178465.4 filed on Jul. 30, 2013, the entire disclosures of which are incorporated herein by way of reference.

BACKGROUND OF THE INVENTION

The present invention relates to a new design for the rear fuselage section of an aircraft, specifically for those aircraft that comprise a horizontal tail plane (HTP) with a box-type central element.

One object of this invention is to provide a rear fuselage section for an aircraft wherein the cut-out required for emplacing the HTP is displaced from a structural part of the rear fuselage section to a non-structural part of said rear fuselage section. Thus, the invention provides a rear fuselage section for an aircraft which is optimal in terms of stiffness and is easy to manufacture.

Another object of this invention is to provide a rear fuselage section for an aircraft that eases the assembly of the section. By dissociating structural and non-structural requirements in the rear fuselage section, the invention enables a rear fuselage section that involves the assembly of continuous frames instead of split frames with joining requirements in a structural part of the rear fuselage section.

Another object of this invention is to provide a rear fuselage section for an aircraft that eases the maintenance tasks of the section. Having a rear fuselage section with the cut-out in a non-structural part of the rear fuselage section, and, providing a detachable fairing in said non-structural part, the invention eases the access to the bottom part of the aircraft. Thus, the invention provides a rear fuselage section that simplifies the maintenance and repair tasks, no longer requiring to remove the tail cone to access the box-type central element of the HTP or the THSA, but detaching the fairing provided to inwardly enclose the HTP or accessing it through access doors.

As it is known, the rear end of the fuselage of an aircraft supports both the vertical and horizontal tail planes (VTP and HTP). Both planes act during standard aircraft operations to trim the aircraft in flight in order to provide stability and control. As is shown in FIG. 1, the rear end of the fuselage comprises two different sections, the tail cone 1 and a rear fuselage section 2. Commonly, the VTP 17 and the HTP 23 are fitted to said rear fuselage section 2.

The majority of conventional HTP's comprise two lateral bodies joined to a central element. The lateral bodies project outwardly from each lateral side of the aircraft fuselage, and the central element, which is joined to both lateral bodies crosses the internal aircraft structure by means of openings in the fuselage skin. There are two kinds of HTP depending on the type of central element they comprise. The central element can be a piece composed of a number of shafts/rods (as shown in FIG. 2a), or of a box-type central element (as shown in FIGS. 2b and 2c), specifically consisting on a center-joint.

For illustrative purposes, FIGS. 2a, 2b and 2c are provided to show a cross section of the aircraft, along the xy plane as detailed in FIG. 1. FIG. 2a shows an HTP which comprises two lateral boxes 5 joined proximately at their edges by a front shaft 3 and a rear shaft 4, wherein both shafts 3, 4 are joined together by an assembly of shafts along the aircraft symmetry plane 25. FIGS. 2b and 2c show two possible embodiments for HTPs with a box-type central element configured to join the two lateral torsion boxes. In both cases, the box-type central element transversely crosses the rear section of the fuselage of the aircraft, requiring a box-shaped opening in the fuselage. FIG. 2b shows a box-type central element 19 whose configuration comprises a central torsion box. FIG. 2c shows a box-type central element configured to join the two lateral torsion boxes 20 along the aircraft symmetry plane 25, wherein said configuration comprises a rib 18. In this last embodiment, the box-type central element is formed by the portion of the two lateral torsion boxes 20 which lies within the fuselage of the aircraft.

The need for the HTP to trim while, at the same time, remaining attached or mounted to the rear fuselage section, means piercing the fuselage skin. FIGS. 3a and 3b show the footprint on the fuselage skin of the openings in the fuselage due to the emplacement of the two types of HTPs.

In the case of an HTP with a central element formed by shafts, the fuselage skin has to be pierced, and two slots have to be provided in the fuselage skin to allow the HTP to trim. These slots enable the joint between shafts and lateral boxes and the trimming of the whole structure. The rear shaft defines the pivoting axis for the HTP trimming, whereas the front shaft is driven by an actuator to perform the trimming movement. Neither the front nor the rear shafts of this HTP cross any frame of the rear fuselage section, so there are no interrupted frames in this kind of HTP assembly. FIG. 3a shows a lateral view of the fuselage skin 27 perforated by the slots 30.

In the case of an HTP with a box-type central element, the rear fuselage section has to be crossed by said central element and, at least, one frame has to be split for emplacing the HTP in its conventional mid-frame position. Said emplacement also entails a full removal of a section panel of the fuselage skin, hereinafter referred to as cut-out, which is needed, not only to attach the HTP to the fuselage structure, but also to allow it to trim. FIG. 3b shows a lateral view of the fuselage skin 27 with a cut-out 7 for emplacing the HTP. The cut-out 7 must be bigger than the box-type central element 19 for allowing the HTP to trim. Since the integration of the HTP with the fuselage skin must comply with severe aerodynamic constraints, the spaces between the walls of the cut-out 7 and the HTP torsion box have to be covered by a dedicated element 32 for ensuring a correct aerodynamic behavior of the area.

Commonly, this dedicated element may consist of an apron or a shield. An apron is made of a deformable material, suitable for adapting itself to the HTP movement, as it is attached both to HTP and cut-out walls and always covers the gaps between said parts. Thus, an apron is more suitable for covering small openings in the fuselage skin where the surface curvature of the rear fuselage is small. Shields, on the other hand, are made of rigid material and move together with the HTP. Shields are more suitable for covering bigger openings, such as those used in wide-body aircrafts. These big openings also usually require modifying the aerodynamic surface of the fuselage skin surrounding the cut-out to reduce the gaps between the leading and trailing edge structures of the HTP and the walls of the cut-out and to provide enough space for said structures to be able to move during the trimming of the HTP. This modification usually implies moving away from a conventional conical section which is easy to remold towards a much more complicated section which poses difficulties in said stage.

Focusing on HTPs with a box-type central element, FIG. 4 shows in greater detail a perspective view of a rear fuselage section, wherein the tail cone is removed and the tail cone attachment fittings 11 appear in the foreground. As has been mentioned, the cut-out 7 for the HTP forces to construct, at least, one of the frames 6 of the aircraft, not as a unitary body, but as separated pieces, joined together by ancillary elements that act as horizontal stabilizer attachment fittings, commonly referred to as swingles 8. Swingles 8 provide the attachment points that create the pivot axis 29 around which the HTP rotates to trim the aircraft.

As the cut-out 7 entails a stiffness reduction in the fuselage skin, the section is reinforced by means of reinforcement 12. Conventionally, said means of reinforcement 12 are stiffening elements disposed in the trace of stringers to frame the cut-out 7 and, the means of reinforcement 12 are joined to the stringers 31 of the fuselage section once the cut-out 7 ends. Said means of reinforcement 12 are highlighted for illustrative purposes, but they are inwardly mounted at the section shown.

Additionally, since the rear fuselage section 2 has to be able to support heavy loads, appropriate elements have to be incorporated to the split frames 6 for achieving a convenient distribution of the loads absorbed by the section. For this purpose, split frames 6 further comprise tie 10 and stiffening beams 13. Frames 6 and swingles 8 are joined together by diagonal support struts 9.

The fastening of the HTP to the rear fuselage section is made by horizontal stabilizer attachment fittings (swingles). Both swingles, each one on the lateral sides of the aircraft, define the pivot axis around which the HTP rotates. The trimming of the HTP is achieved by means of an actuator, called trimmable horizontal stabilizer actuator (THSA). FIGS. 5a and 5b show different views that involve the THSA 15 and its connection with other elements of the rear fuselage section.

FIG. 5a shows a schematic lateral view of the aircraft that details the fastening of the HTP to swingles. Conventionally, at one side, the box-type central element 19 of the HTP is attached to swingles 8 by means of a lug 32, and at its opposite side, to the THSA 15. Through its attachment, the THSA 15 drives the rotating movement of the HTP.

As conventionally, FIG. 5b shows the THSA 15 placed along the aircraft symmetry plane 25, in a forward position with respect to the front spar 34 of the torsion box of the HTP. The fitting of said front spar 34 with the THSA 15, is typically made by means of a jackscrew 33. At each side of the rear spar 35 of the torsion box, close to the fuselage skin 27, the lug 32 attaches the rear spar 35 to the swingle 8.

As it has been mentioned, HTPs with a box-type central element involves several drawbacks that need to be addressed.

There are known solutions that avoid the need for the cut-out for locating the HTP. For example, Spanish patent ES2373812B1 discloses a horizontal stabilizer configuration with a negative sweep angle, where the structural configuration of the VTP and the aircraft fuselage frames are such that it enables the connection of the HTP to the rear end of the fuselage, without requiring the fuselage to have a structural opening. The patent describes a structural connection of the HTP to the aircraft fuselage made between points of the front spar of the HTP and a fuselage frame, such that a structural opening is not required in the skin panels of the fuselage affected by the VTP and HTP load introduction. In this way, that solution avoids a cut-out in a zone heavily affected by the structural loads introduced by VTP and HTP.

However, a new design for the rear fuselage section of an aircraft with a weight reduction and an easier manufacturing and assembly are still desired for an HTP assembly with a box-type central element.

SUMMARY OF THE INVENTION

This invention overcomes the above-mentioned drawbacks by providing a new design for the rear fuselage section of aircraft, which comprises an HTP with a box-type central element. This new rear fuselage section eases the manufacturing of the section, achieves a weight reduction, a stiffness optimization and facilitates the assembly and the repair tasks. At the same time, this new section meets all of the aerodynamic requirements.

In one aspect of the invention, the rear fuselage section of an aircraft comprises at least one closed frame constructed as a unitary body, and an HTP comprising two lateral torsion boxes and a box-type central element configured to join the two lateral torsion boxes, said HTP being trimmable with respect to a pivot axis. The HTP is mounted at the closed frame and the pivot axis is contained in a horizontal plane below the lowest end of said closed frame.

In any event, for the purposes of describing this invention, a horizontal plane should be understood as a plane parallel to the ground when the aircraft t is on the ground.

Additionally, a box-type central element should be understood as referring to that portion of the two lateral torsion boxes which lies within the fuselage of the aircraft, said portion with a box shape and requiring a box-shaped opening.

The rear fuselage section can be seen as comprising a first section, corresponding to the structural part of the section, containing the unitary closed frame and the fuselage of the aircraft, and a second section, corresponding to the non-structural part of said section, preferably containing, at least, a fairing.

By functionally dividing the rear fuselage section into a first structural section and a second non-structural section some requirements, such as the need for an opening (cut-out) to emplace the HTP, are displaced from the first section to the second section. Thus, the new rear fuselage section shifts the design complexity to a second section, which is easier to manufacture as it does not contain structural elements.

Therefore, a technical effect and advantage of the invention is that manufacturing is simplified. The new rear fuselage section comprises entire frames that allows the section manufacture as one piece, and provides a potentially one-shot fuselage section manufacture.

Also, and given that the cut-out for the HTP is displaced to a non-structural section, the need for strengthening the opening by conventional means of reinforcement is removed. In this respect, the rear fuselage section simplifies the manufacture at the same time as it achieves a weight reduction.

Moreover, the new rear fuselage section avoids the need of creating indentations in the areas of the fuselage surrounding the cut-out, conventionally provided for modifying the aerodynamic surface of the fuselage skin to meet aerodynamic requirements. In this way, the manufacture of the section is also simplified, at the same time that the aerodynamic requirements are met.

Likewise, another technical effect and advantage of the invention is that assembly is simplified. The new rear fuselage section involves the assembly of, at least, one unitary closed frame and a fairing, instead of split frames with joining requirements. The fairing can be modular or manufactured as one piece, but in either case, the fairing assembly entails an easier assembly, involving bigger pieces that imply fewer elements.

Also, the assembly of the new rear fuselage section avoids conventionally connecting pieces between the means of reinforcement and the stringers, so, a simplification in assembly and a weight reduction are additionally achieved.

Additionally, regarding the HTP mounting location, another technical effect and advantage of the invention is that maintenance and repair tasks are simplified, not being required to take away the tail cone to access the box-type central element of the HTP or the THSA but detaching the fairing provided to inwardly enclose the HTP from the bottom part of the aircraft.

Therefore, the new rear fuselage section focuses the complexity in a non-structural section, easier to manufacture, assemble and repair. Additionally, a weight reduction is achieved and the aerodynamic requirements are met.

BRIEF DESCRIPTION OF THE DRAWINGS

For a better comprehension of the invention the following drawings are provided for illustrative and non-limiting purposes, wherein:

FIG. 2a shows a plan view of an HTP with an enlarged detail of a central element formed by an assembly of shafts. FIGS. 2b and 2c show plan views of different embodiments of an HTP with a box-type central element.

FIG. 3a shows a lateral view of a fuselage for emplacing an HTP with a central element formed by an assembly of shafts. FIG. 3b shows a lateral view of a fuselage with a emplacement for an HTP with a box-type central element.

FIG. 5a shows a schematic lateral view and FIG. 5b a plan view.

FIG. 7a corresponds to a closed frame constructed as a ring-shaped body and FIG. 7b constructed as a body which comprises rounded upper and lower sides and substantially straight lateral sides.

FIGS. 8a and 8b show two potential locations for the THSA.

DETAILED DESCRIPTION OF THE PREFERRED EMBODIMENTS

Figure 1:
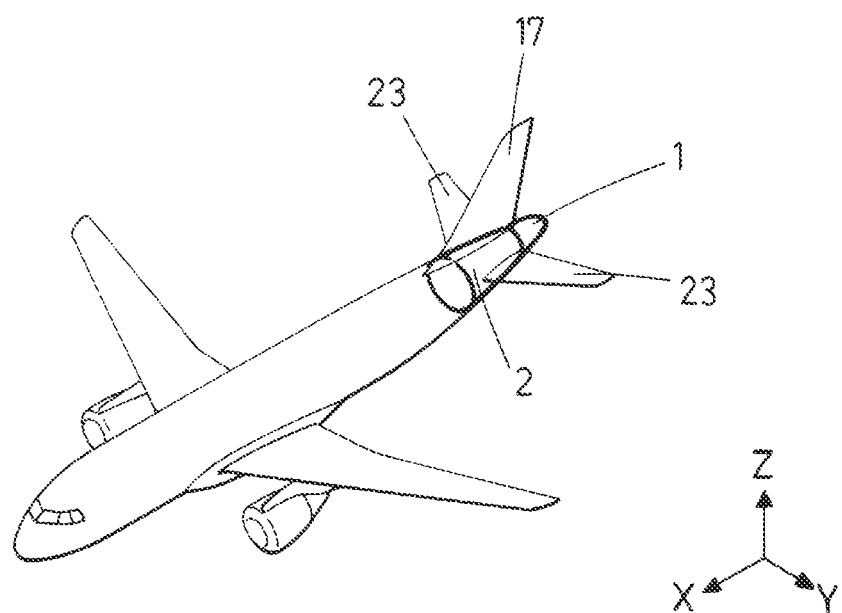
FIG. 1 shows a view of an aircraft wherein the rear end of the fuselage of an aircraft comprising the rear fuselage section and the tail cone sections have been highlighted. The X direction represents the direction of flight of the aircraft.
Figure 2A:
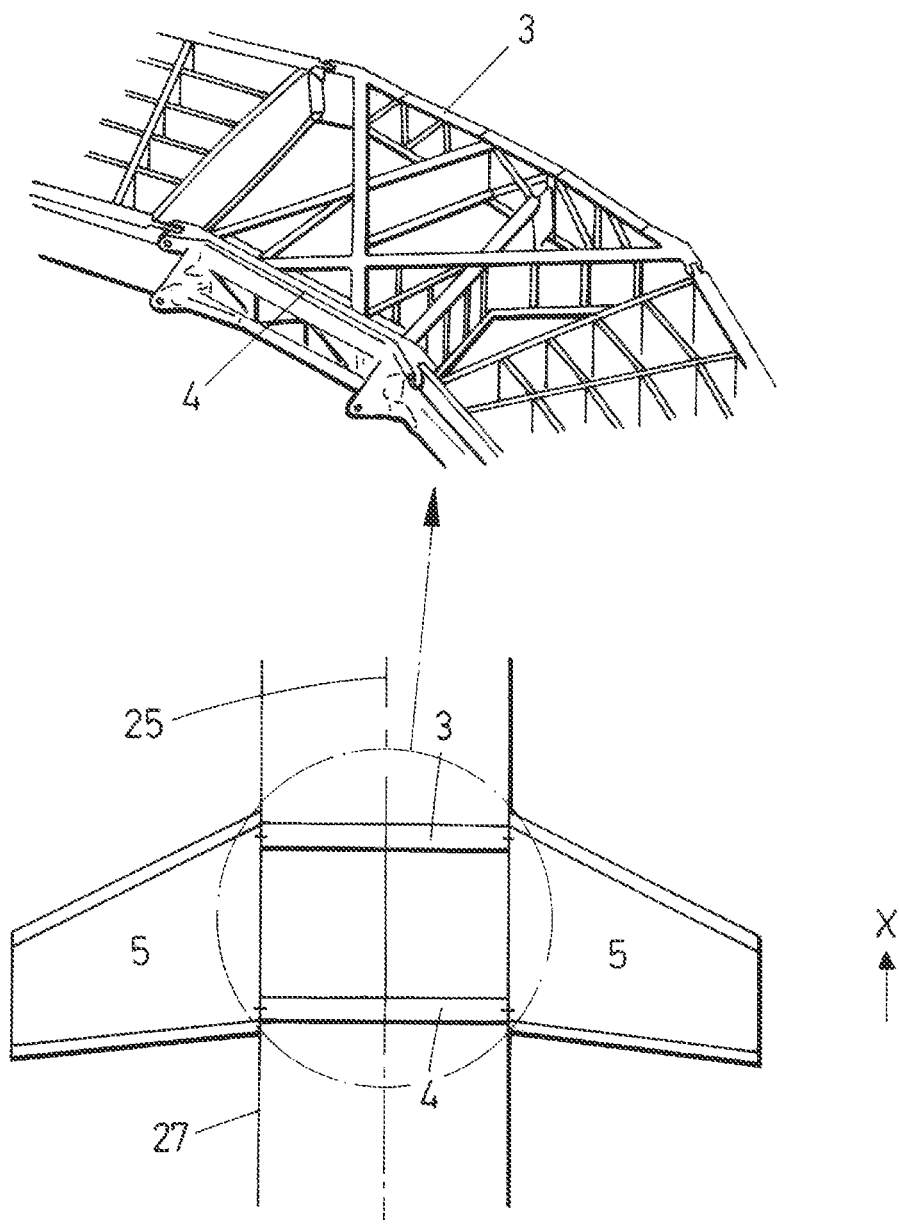
FIGS. 2a, 2b and 2c show prior art plan schematic views of two different types of aircraft, attending to the HTP central element type.
Figure 2B:
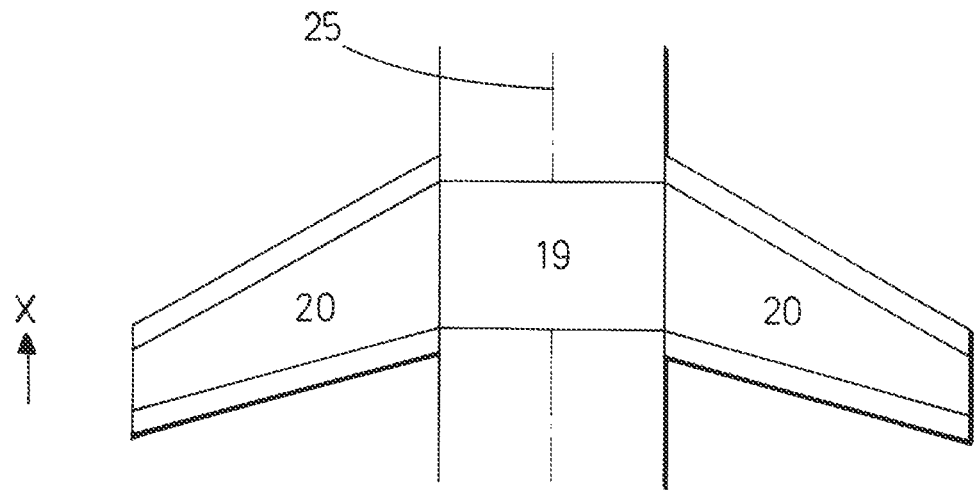
Figure 2C:
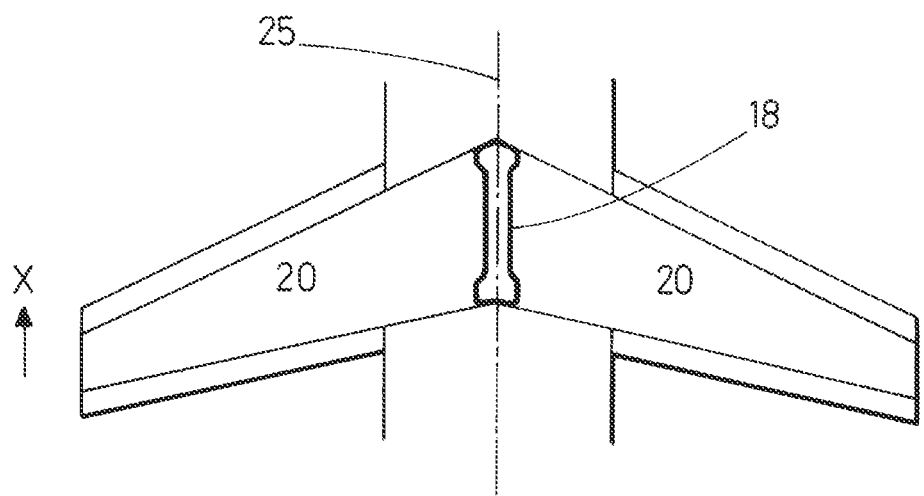
Figure 3A:
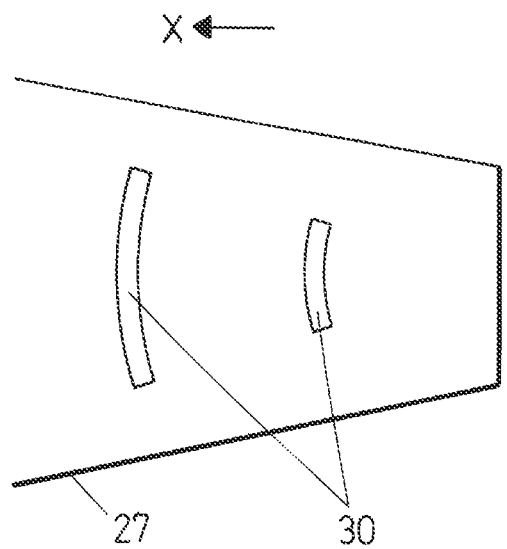
FIGS. 3a and 3b show prior art lateral views of the fuselage skin of the two types of HTPs.
Figure 3B:
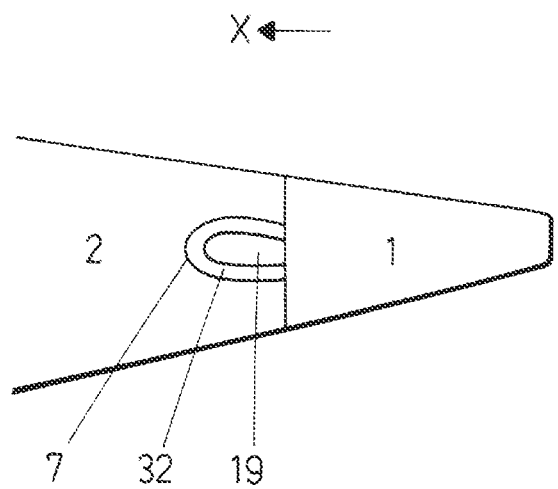
Figure 4:
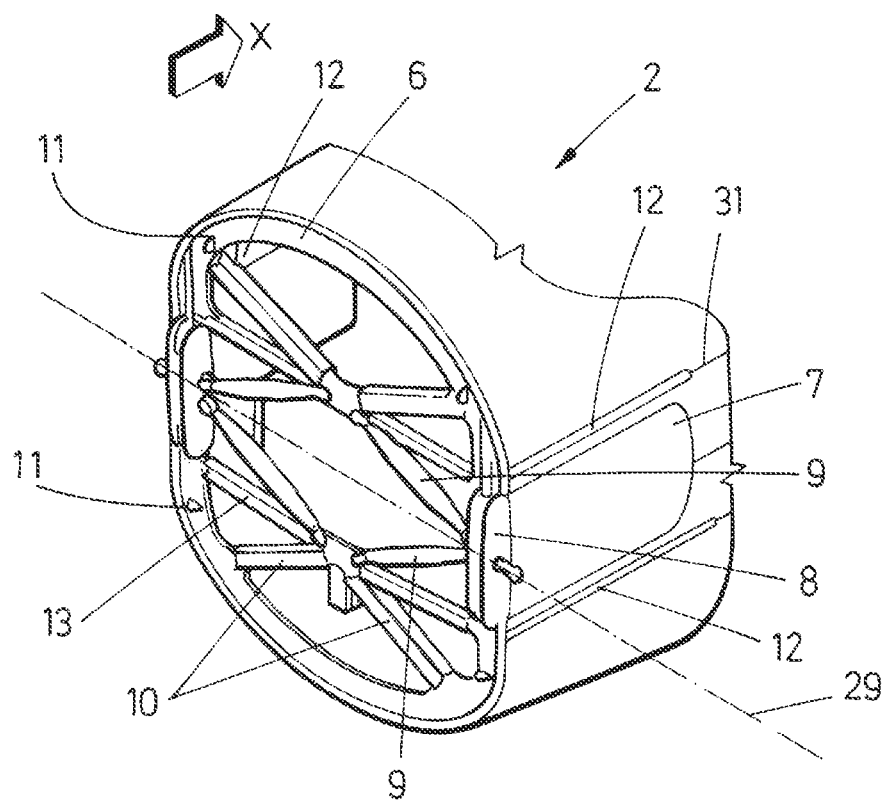
FIG. 4 shows a perspective view of a prior art rear fuselage section of an aircraft.
Figure 5A:
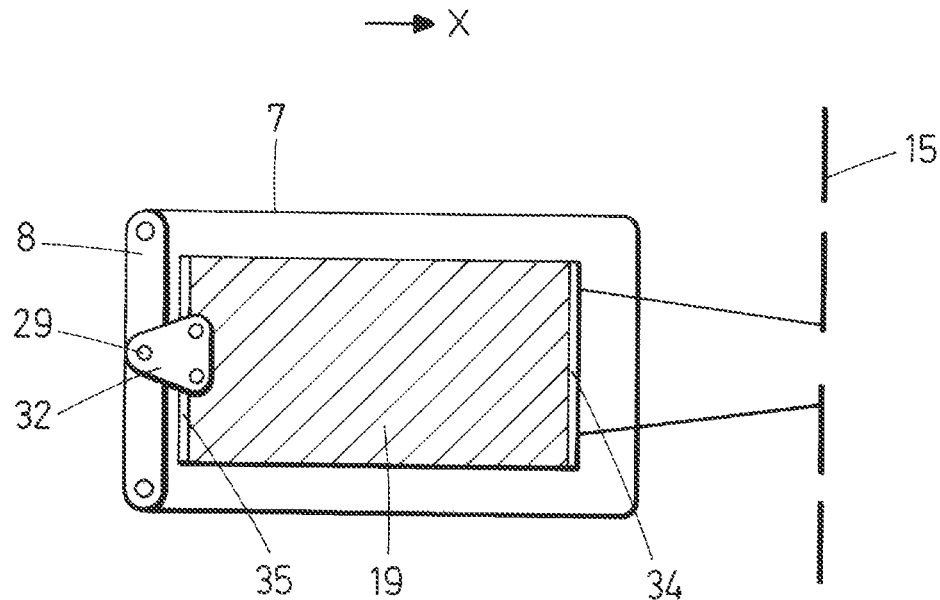
FIGS. 5a and 5b show prior art views of the HTP connected to the THSA and to the swingles.
Figure 5B:
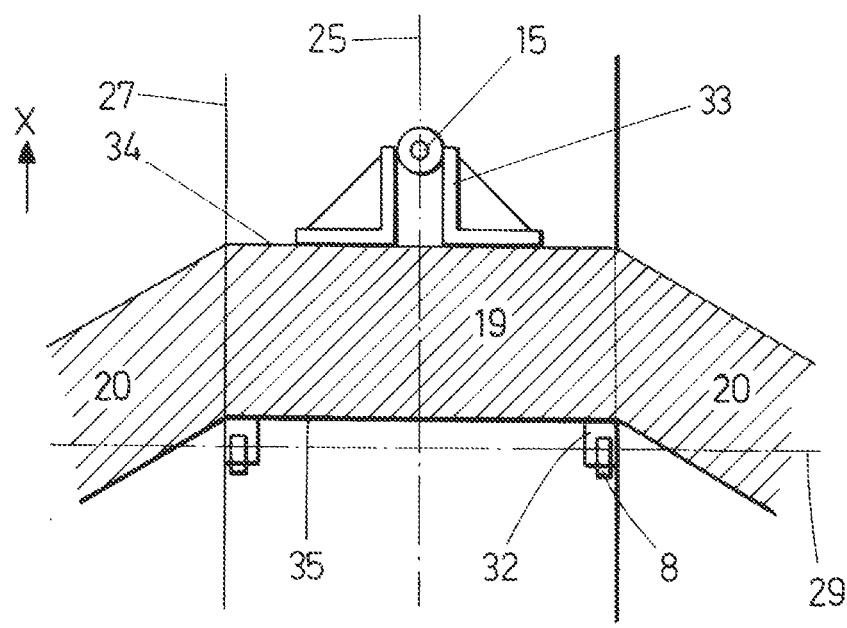
Figure 6:
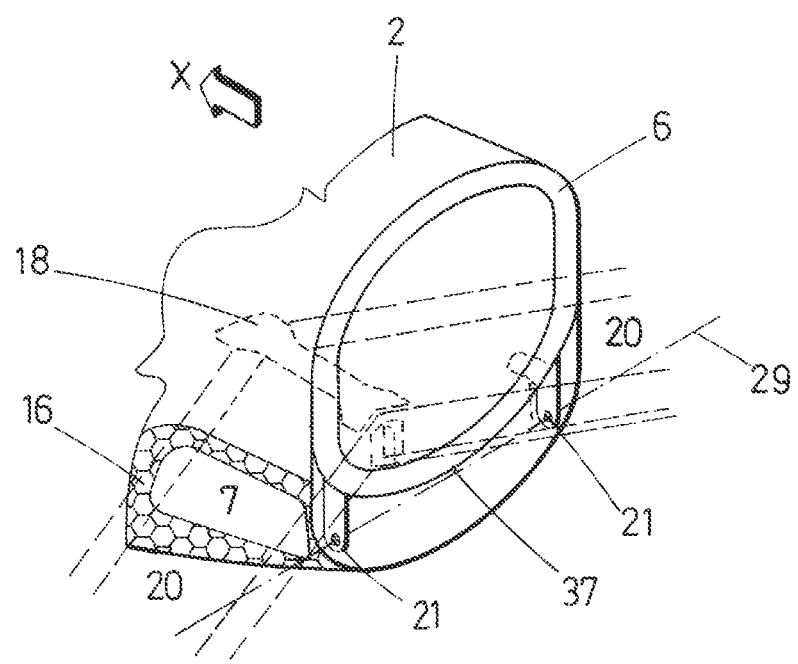
FIG. 6 is a schematic perspective view of the arrangement of the HTP according to an embodiment of the present invention.

In the preferred embodiment of FIG. 6, the rear fuselage section 2 of an aircraft comprises at least one closed frame 6 constructed as a unitary body, and an HTP comprising two lateral torsion boxes 20 and a box-type central element 19 configured to join the two lateral torsion boxes 20, wherein said HTP is trimmable with respect to a pivot axis 29. The HTP is mounted at the closed frame 6 and the pivot axis 29 is contained in a horizontal plane 36 below the lowest end 37 of the closed frame 6. In the embodiment of the figure, the configuration of the box-type central element comprises a rib 18 that joins said two lateral torsion boxes 20.

FIG. 6 shows the modified position of the HTP, emplaced in a lower position according to the invention, specifically to be positioned in a way that its pivot axis 29 is contained in a horizontal plane 36 below the lowest end 37 of the closed frame 6.

Preferentially, the HTP 23 is mounted at the closed frame 6 by horizontal stabilizer attachment fittings 21 arranged at the both sides of the lowest end 37 of the closed frame 6.

In another preferential embodiment, the closed frame 6 is a ring-shaped body and the horizontal stabilizer attachment fittings 21 are arranged at a lowermost segment 24 of said closed frame 6, being said lowermost segment 24 delimited by a 45 degree angle extended to both sides from the aircraft symmetry plane 25.

Figure 7A:
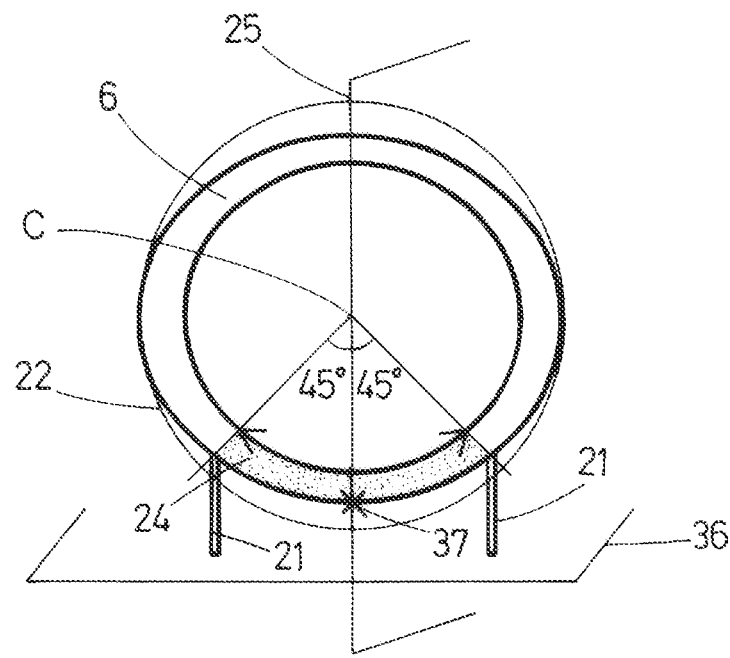
FIGS. 7a and 7b show a cross-sectional view that schematically shows a lowermost segment of the closed frame, that comprises the lowest end of the closed frame, according to one embodiment of the invention.

As shown in FIG. 7a, the lowermost segment 24 of the closed frame 6 is delimited by the 45 degree angle extended to both sides from the aircraft symmetry plane 25, and from the geometer center C of a circumference within which the closed frame 6 can be circumscribed.

Figure 7B:
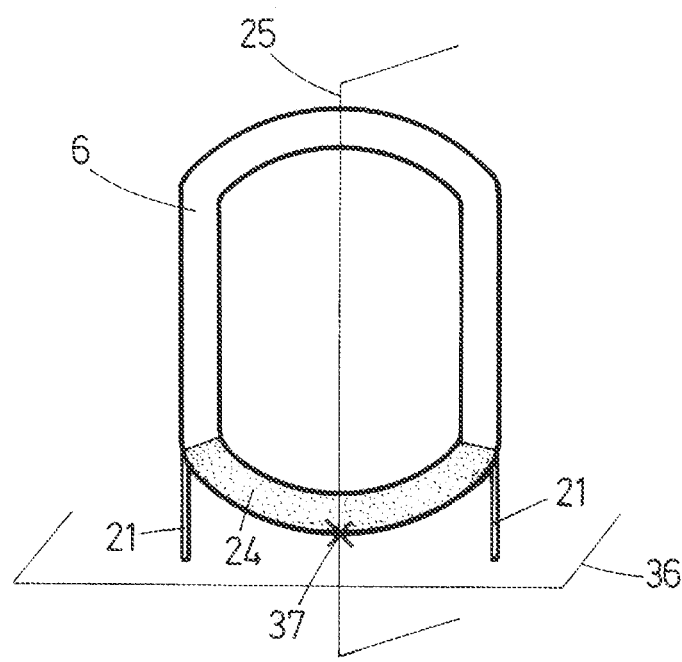

FIG. 7b shows another preferential embodiment in which the closed frame 6 is an body with rounded upper and lower sides and substantially straight lateral sides and, wherein the attachment fittings 21 are arranged at a lowermost segment 24 of said closed frame 6, being said lowermost segment 24 delimited by the transition between the rounded lower side and the substantially straight lateral sides.

Preferentially, as shown in FIGS. 7a and 7b, the attachment fittings 21 are arranged at the both extremes of the lowermost segment 24 of the closed frame 6. It is desirable that the fittings are as low as possible and as short as possible, for reducing the weight of the fittings. Thus, in a preferential embodiment, the attachment fittings 21 comply with these preferences.

The HTP 23 is suitably mounted at the lowest end 37 of the closed frame 6, at mounting points located within the extension of said lowermost segment 24. FIGS. 6, 7a and 7b shown the horizontal stabilizer attachment fittings 21 that protrude downwardly from the mounting points above mentioned, providing the attachment points between the HTP and the closed frame 6 in a non-structural area of the aircraft.

Preferentially, the rear fuselage section 2 further comprises a detachable fairing 16 configured to inwardly enclose the HTP 23, said fairing 16 having a pair of cut-outs 7, each cut-out 7 for containing one of the lateral torsion boxes 20 of the horizontal tail plane 23.

Figure 8A:
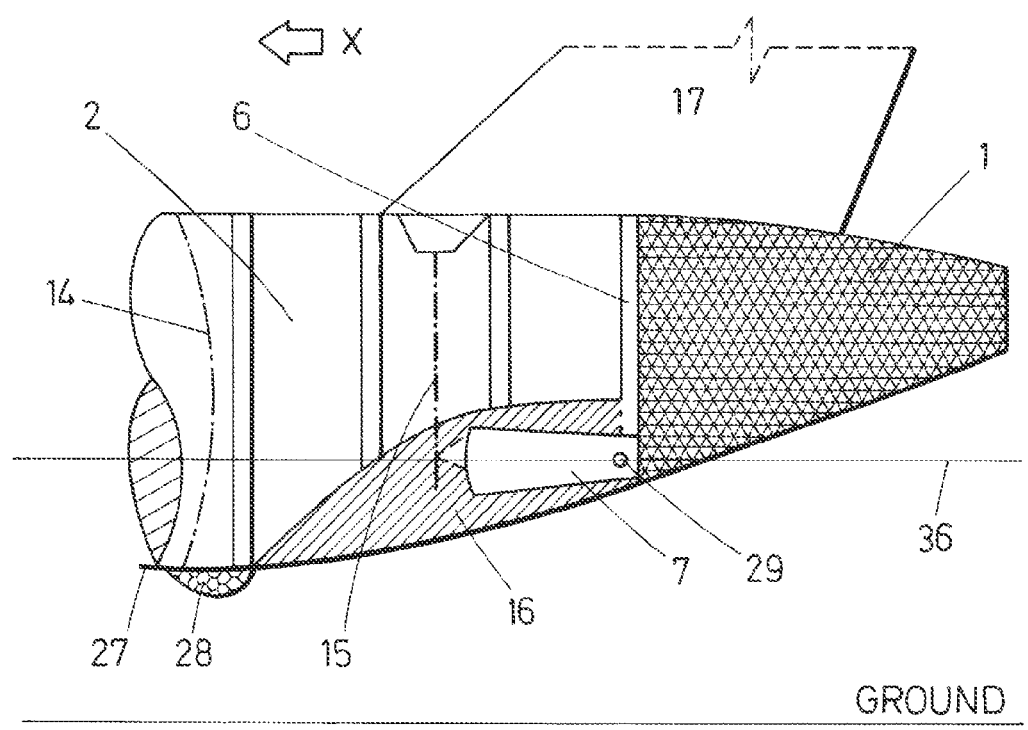
FIGS. 8a and 8b are side-elevation views of two embodiments of the invention, where, in both, the HTP is located at the closed frame between the rear pressure bulkhead and the tail cone in such a way that its pivot axis is contained in a horizontal plane lower than the lowest end of said closed frame.
Figure 8B:
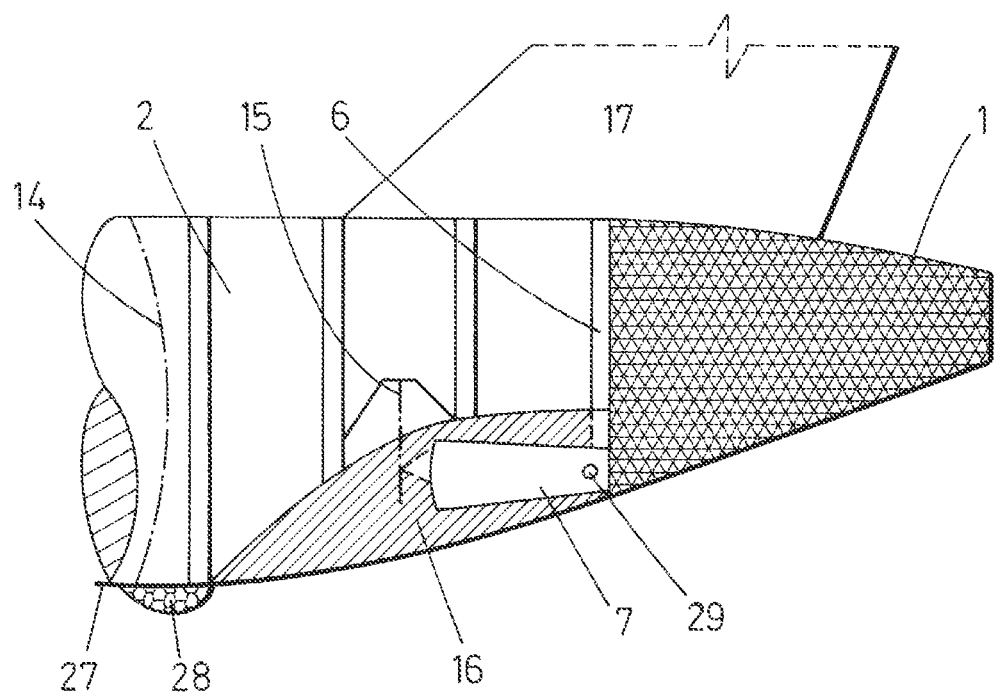

Both FIGS. 8a and 8b show a side-elevation views of two possible embodiments of the invention wherein the HTP 23 is not shown but its potential location is represented trough the cut-out 7 of the fairing 16. Both figures clearly show how the traditional mid-frame position of the HTP 23 is modified to a lower one according to the invention. In the embodiment of the figures, the configuration of the box-type central element comprises a torsion box which joins the two lateral torsion boxes 20.

Preferentially, as shown in FIGS. 8a and 8b, the closed frame 6 at which the HTP 23 is mounted, is the last frame of the rear fuselage section 2, that is, the frame that closes said rear fuselage section 2, and wherein the last is referred to the flight direction of the aircraft, the X axis. As shown in said figures, in another preferential embodiment the fairing 16 extends along the longitudinal axis of the aircraft from the rear pressure bulkhead 14 to the HTP pivot axis frame, in the figures, the last frame 6 shown in the rear fuselage section 2. Preferentially, the HTP 23 is boxed between said rear pressure bulkhead 14 and the tail cone 1.

Additionally, in another preferred embodiment, the THSA 15 is mounted to the upper part of the structural rear fuselage section 2, as shown in FIG. 8a, or, according to another preferred embodiment, mounted to the lower part of the structural rear fuselage section 2, as shown in FIG. 8b.

Moreover, in another preferential embodiment, along the Z axis, the dimension of the fairing 16 will be defined by the size of the cut-out 7 in addition to the required manufacturing clearances, where the size of the cut-out 7 is defined by the rotation of the lateral torsion boxes 20 around the pivot axis 29 plus manufacturing tolerances.

An additional technical effect and advantage of the invention, is that any intricate shape of the rear fuselage section which is difficult to manufacture, is provided at the fairing 16 instead of at the load-bearing part of the rear fuselage section.

Preferably, the fairing 16 is made of composite material. And as shown in FIGS. 8a and 8b, the fairing 16 is detachably attached to the structural rear fuselage section, satisfying the continuity of the fuselage skin 27 of the rear fuselage section 2 with the fuselage skin 27 of the rest of the aircraft. Also in the lower part of said figures, is shown the tail bumper 28 fixed at the fuselage skin 27 close to the rear pressure bulkhead 14 and the fairing 16 in order to prevent damage in the event of a tail strike.

Preferentially, the box-type central element 19 has a front spar 34 and a rear spar 35. In another preferential embodiment, the HTP 23 is mounted at the closed frame 6 by the rear spar 35 of its box-type central element 19. And in another preferential embodiment, the HTP 23 is connected to a trimmable horizontal stabilizer actuator 15 by the front spar 34 of its box-type central element 19. Being the front and the rear referred to the flight direction of the aircraft, the X axis. In this preferred embodiment, the THSA 15 may be mounted to the upper part of the structural rear fuselage section 2, as shown in FIG. 8a, or to the lower part of said structural rear fuselage section 2, as shown in FIG. 8b.

Figure 9:
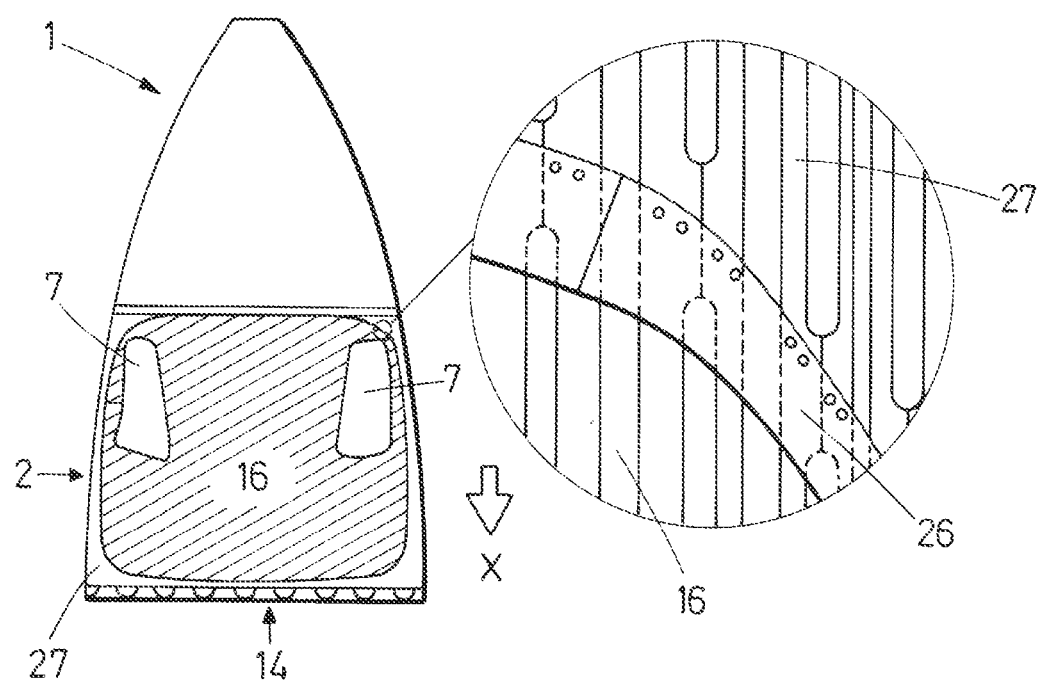
FIG. 9 is a planform view looking upwards to the belly of the aircraft where the fairing is provided to enclose the HTP. The figure includes an enlarged detail of the fairing attachment to the fuselage skin.

FIG. 9 shows a fairing 16 which is preferably provided to enclose the HTP 23, and comprises a pair of cut-outs 7 for the protrusion of the two lateral boxes 20 of the HTP 23. As is shown in more detail in the enlarged view of that FIG. 9, the fairing 16 is preferably attached to a profile 26 which is riveted to the fuselage skin 27 of the aircraft.

Preferably, the rear fuselage section according to this invention is made of composite material, such as Carbon Fiber Reinforced Plastic (CFRP).

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A rear fuselage section of an aircraft comprising:
    at least one closed frame constructed as a unitary body,
    a horizontal tail plane comprising two lateral torsion boxes and a box-type central element configured to join the two lateral torsion boxes,
    said horizontal tail plane being trimmable with respect to a pivot axis,
    said horizontal tail plane being mounted at the closed frame,
    the pivot axis being contained in a horizontal plane below a lowest end of said closed frame, and
    a detachable fairing configured to inwardly enclose the horizontal tail plane, the fairing having a pair of cut-outs, each cut-out for containing one of the lateral torsion boxes of the horizontal tail plane.

2. The rear fuselage section of an aircraft according to claim 1, wherein the horizontal tail plane is mounted at the closed frame by horizontal stabilizer attachment fittings arranged at both sides of the lowest end of the closed frame.

3. The rear fuselage section of an aircraft according to claim 2, wherein the closed frame is a ring-shaped body and the attachment fittings are arranged at a lowermost segment of said closed frame, said lowermost segment being delimited by a 45 degree angle extended to both sides from the aircraft symmetry plane.

4. The rear fuselage section of an aircraft according to claim 2, wherein the closed frame is a body with rounded upper and lower sides and substantially straight lateral sides and, wherein the attachment fittings are arranged at a lowermost segment of said closed frame, said lowermost segment being delimited by a transition between a rounded lower side and substantially straight lateral sides.

5. The rear fuselage section of an aircraft according to claim 3, wherein the attachment fittings are arranged at both extremes of the lowermost segment of the closed frame.

6. The rear fuselage section of an aircraft according to claim 1, wherein the fairing is attached to a profile fastened to a fuselage skin of the aircraft.

7. The rear fuselage section of an aircraft according to claim 1, wherein said fairing is made of composite material.

8. The rear fuselage section of an aircraft according to claim 1, wherein the box-type central element has a front spar and a rear spar and the horizontal tail plane is mounted at the closed frame by said rear spar.

9. The rear fuselage section of an aircraft according to claim 1, wherein the box-type central element has a front spar and a rear spar and the horizontal tail plane is connected to a trimmable horizontal stabilizer actuator by said front spar.

10. The rear fuselage section of an aircraft according to claim 1, further comprising a rear pressure bulkhead and a tail cone coupled with said closed frame, wherein the horizontal tail plane is boxed between said rear pressure bulkhead and said tail cone.

11. The rear fuselage section of an aircraft according to claim 1, further comprising a tail bumper fixed at the fuselage skin comprised between the rear pressure bulkhead and the fairing for providing a tail strike protection.

12. The rear fuselage section of an aircraft according to claim 1, wherein the closed frame is the last frame of said rear fuselage section.

* * * * *